United States Patent [19]

Crawford

[11] 4,046,179
[45] Sept. 6, 1977

[54] CROSS-CUT SHEAR FOR TREES

[76] Inventor: Patrick J. Crawford, 1013 S. Lincoln St., Shawano, Wis. 54166

[21] Appl. No.: 594,694

[22] Filed: July 10, 1975

[51] Int. Cl.² ............................................. A01G 23/08
[52] U.S. Cl. .................................... 144/34 E; 83/600; 83/928; 144/3 D; 144/309 AC
[58] Field of Search ................ 83/679, 697, 600, 928; 144/2 Z, 3 D, 34 R, 34 E, 309 AC; 30/228

[56] References Cited

U.S. PATENT DOCUMENTS

| 944,555 | 12/1909 | Holden | 144/34 E |
| 3,122,184 | 2/1964 | Larson | 83/600 X |
| 3,294,131 | 12/1966 | Larson | 83/600 X |

*Primary Examiner*—Othell M. Simpson
*Assistant Examiner*—W. D. Bray
*Attorney, Agent, or Firm*—Wicks & Nemer

[57] ABSTRACT

A cross-cut shear for trees including a support. A pair of cutting blades each having an arcuate cutting edge terminating in a straight cutting edge tangential to the arcuate cutting edge, the blades pivotally mounted on the support for pivotal and guided movement to bring the blades toward one another to cause the arcuate edges to first enter a tree followed by the straight edges together with means for pivoting the blades.

10 Claims, 9 Drawing Figures

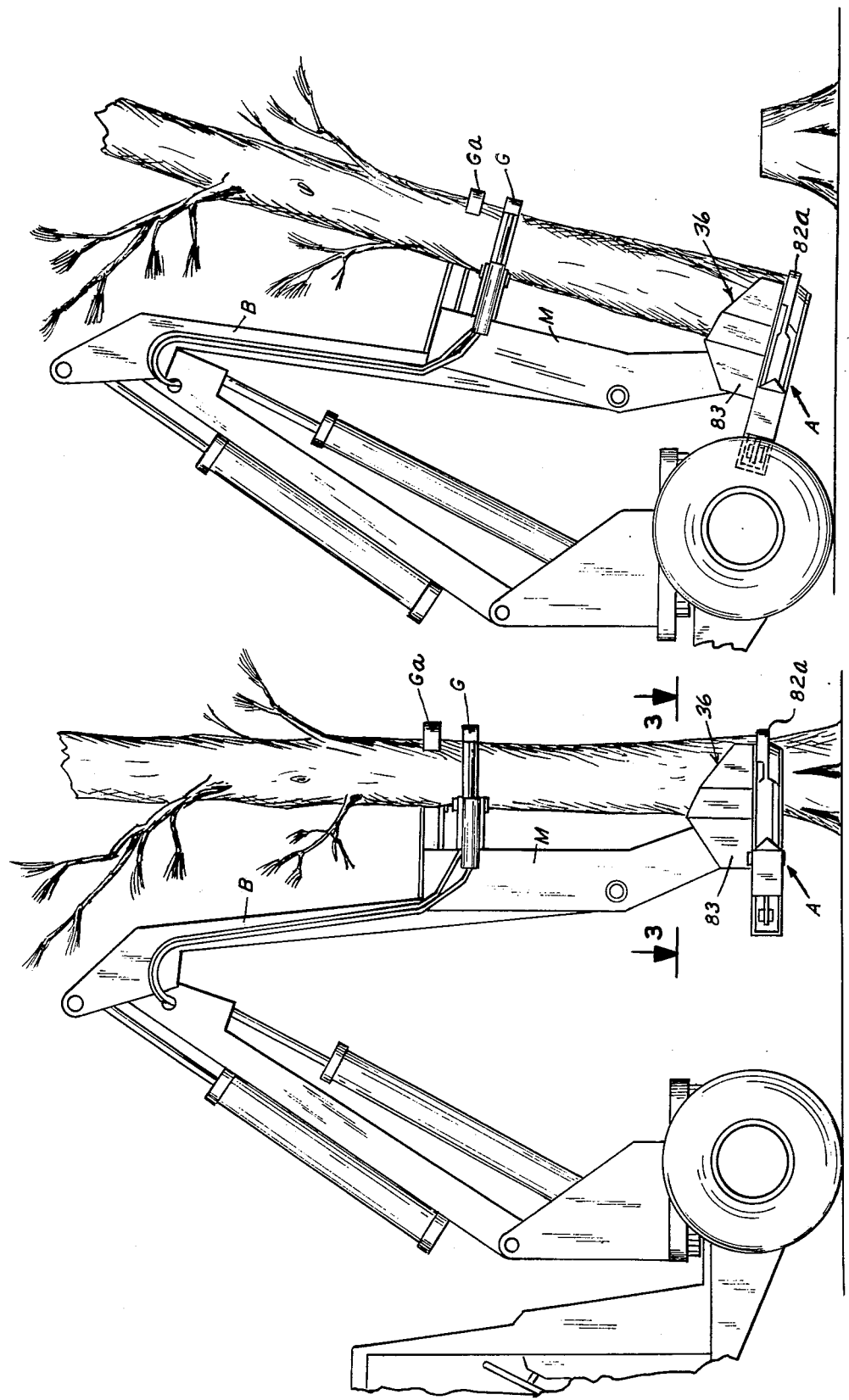

U.S. Patent  Sept. 6, 1977  Sheet 3 of 3  4,046,179
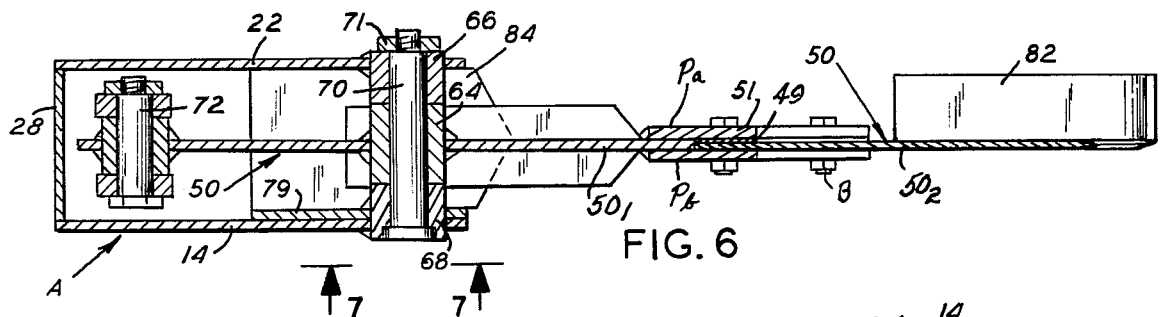
FIG. 6
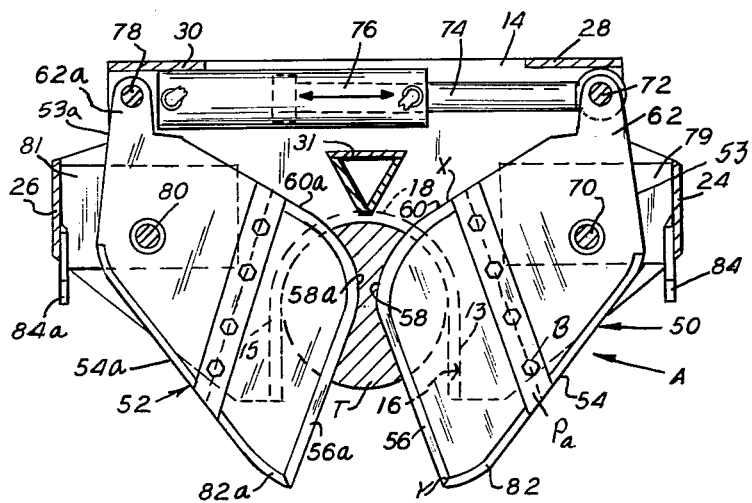
FIG. 7
FIG. 8
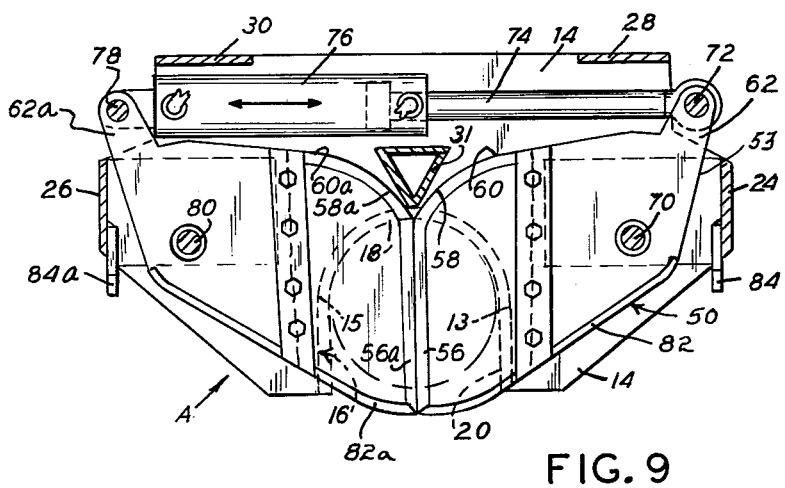
FIG. 9

CROSS-CUT SHEAR FOR TREES

SUMMARY

The invention relates broadly to tree processing equipment and more particularly to a device for shearing trees.

In presently known tree shearing devices the blade action is substantially a compression force to shear the tree from the stump and this requires a relatively large hydraulic cylinder together with a high amount of hydraulic pressure and relatively thick blade to withstand the force required to shear the tree. Such shearing results in a considerable amount of fibre destruction extending from the cut into the tree on both sides of the cut which in many cases leaves such wood unacceptable to saw mills.

The shear device includes a pair of identical cooperating cutting blades each having an arcuate cutting edge which terminates in a tangentially extended straight cutting edge together with means for supporting and activating the blades for pivotal cutting, the cutting being a slicing action of a tree held between the blades. This slicing action is accomplished by the length of the arcuate cutting edge plus the length of the straight cutting edge of each blade which combined lengths are roughly twice the diameter of the largest tree capable of being cut in a given unit.

The configuration of the cutting edge of the blades and the mechanism for pivotal movement thereof causes a cutting of the tree with a slicing-shearing action along with a compression force which continues throughout the entire cutting action of the blades through the tree. The straight cutting edges of the blades meet in abutting alignment as the tree is fully cut. With the cutting action of the blades which allows for a thinner blade there is a minimal of fracture of the wood fibres at and near the cut. Also, because of the shearing action less hydraulic pressure is required which allows for thinner blades and less bulk and weight in the complete unit.

The shear head disclosed herein may be used both for standing trees and for cutting felled trees into specific lengths. The subject shear head can be designed very simply to cut any size tree that the basic carrier unit on which it is mounted can handle, just a matter of making it proportionally larger or smaller.

With the arcuate cutting edge first entering the tree followed by the straight cutting edge, the shearing of a tree is accomplished with the minimal of force applied to the blades and with a minimal of damage to fibres of the tree.

In the drawings forming part of this application:

FIG. 1 is a side elevational view of a shear head unit embodying the invention shown mounted on the end of a boom with a tree gripping device upon a tree.

FIG. 2 is a view similar to FIG. 1 but with the tree shown in sheared and removed condition.

FIG. 6 is a sectional view on the line 6—6 of FIG. 3.

FIG. 7 is a view on the line 7—7 of FIG. 6.

FIG. 8 is a top plan view of the shear head unit with the top plate removed and the blades in partially closed and cutting position.

FIG. 9 is a view similar to FIG. 8 but with the blades in fully closed position.

Figure 3:
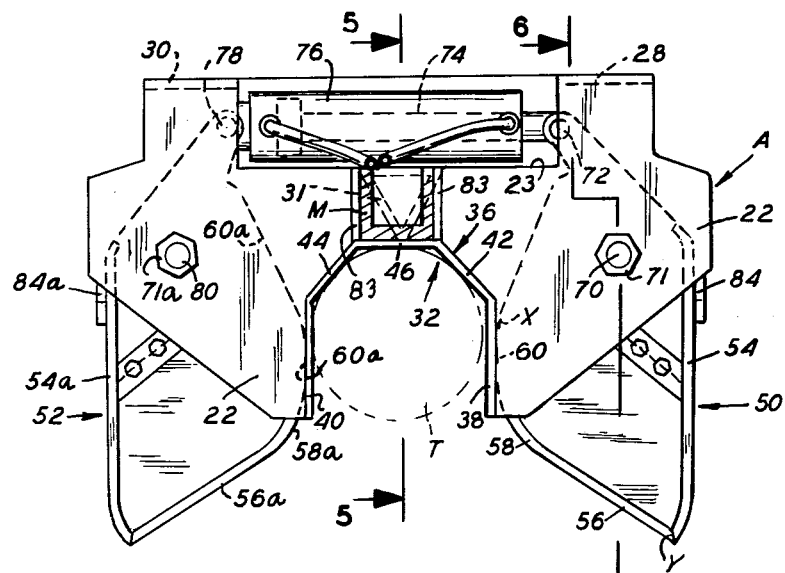
FIG. 3 is a top plan view of the shear head unit substantially on the line 3—3 of FIG. 1 with the shear blades in full open position.

Referring to the drawings in detail, the shear head unit A includes the bottom support plate 14 which has the recess 16 extending thereinto. The recess includes the spaced and parallely disposed side edges 13 and 15 which terminate in the inner semicircular portion 18, particularly FIGS. 8 and 9. Further provided is a first and lower collar 20 obliquely disposed to and converging upwardly from the bottom plate 14. The collar 20 is welded at its lower edge to the plate 14 at the edge of the recess 16. The top edge of the collar 20 forms a blade guide as hereinafter described.

The numeral 22 designates a top support plate formed with the rear rectangular recess 24 and the plate is spaced from the bottom plate 14. The top and bottom support plates are rigidly connected in spaced relation by the side plate members 24 and 26, the rear plate members 28 and 30, and the triangular-shaped internal post 31. The top plate 22 is formed with the recess 32 which includes the parallely disposed side edges 25 and 27 which terminate in the inner semicircular portion 29, the recess 32 substantially overlying the recess 16 of bottom plate 14.

Extending upwardly from the upper plate 22 is the tree guide 36 formed of the side plates 38 and 40 connected to the oblique plates 42 and 44 which are connected to the inner end plate 46. The numeral 48 designates a second and upper collar which is semicircular in formation and which is secured to the underside of the upper plate 22 and depending therefrom and in alignment with recess 32. The lower edge of the collar 48 is spaced from the upper edge of the collar 20 a distance only slightly greater than the thickness of the blades hereinafter described and thereby forms a blade quide as hereinafter referred to.

Further provided are a pair of shear blades 50 and 52 which are identical. Blade 50 will be described in detail, and identical parts of blade 52 will bear identical reference numerals but accompanied by a lower case letter $a$. The blade 50 includes a first straight base edge 53 which terminates in a second straight base edge 54 the outer end of which terminates in the straight cutting edge portion 56 obliquely disposed to the base edge 54. The straight cutting edge portion 56 terminates in the arcuate cutting edge portion 58 with the portion 58 terminating in the straight edge portion 60. The straight cutting edge 56 is tangential to the arcuate cutting edge 58 and the entire cutting edge extends substantially from the outer end of edge 56 point $(y)$ to point $(x)$. At the end of the edge portion 60 is formed the relatively short arm 62.

Secured to and extending through the blade 50 is the boss 64, particularly FIG. 6, and secured to the top plate 22 is the journal 66. A companion journal 68 is secured in the bottom plate 14, and with the pin 70 secured in the boss 64 and journals 66 and 68 by means of nut 71, the blade 50 is mounted for pivotal movement between the top and bottom plates 22 and 14 and the collars 48 and 20 as will be seen.

The blade 50 is made of two parts $50_1$ and $50_2$, particularly FIG. 6 and the part $50_2$ is of thinner material than part 50. The parts $50_1$ and $50_2$ are secured together with the elongated plates Pa and Pb by means of the nut-equipped bolts B. Where the blade parts abut under the plates Pa and Pb the shim 49 is provided to make up for the difference in thickness of the blade parts, FIG. 6 in particular. It will be seen that the blade part 50₂ is less costly than part 50, and may be removed and replaced when deficient.

The arm 62 is pivotally connected by pin 72 to the end of the piston 74 of conventional floating and double acting hydraulic ram 76 actuated by conventional hydraulic means. The ram 76 is pivotally connected by means of pin 78 to the arm 62a of shear blade 52. Shear blade 52 is pivotally mounted on pivot pin 80 in the same manner as blade 50 is mounted on pin 70. Thus by operation of the hydraulic ram 76 the shear blades are brought together for shearing action or separated. With the floating type ram 76 the pressure of the blades equalizes to permit full cutting of a tree regardless of the configuration or position of the tree relative to the blades. The bottom plate 14 is reinforced in the area of pivot pins 70 and 80 by means of the plates 79 and 81.

The blade 50 has formed on the base edge 54 the upstanding retainer flange 82 and together with the companion retainer flange 82a the same maintain the butt of a sheared-off tree upon the blades along with the conventional grippers G and Ga of the mast M on the boom B, particularly FIGS. 2, 8, and 9. The mast M is secured to the pair of spaced plates 83 secured to the top support plate 22.

Further provided is a first stop 84 secured to and extending from the side member 24 which limits the extent of the full open position of the blade 50. A similar stop 84a is secured to and extended from the side member 26 which limits the extent of the full open position of the blade 56a, particularly FIG. 3. The stops 84 and 84a center the blades in the full open position.

Figure 4:
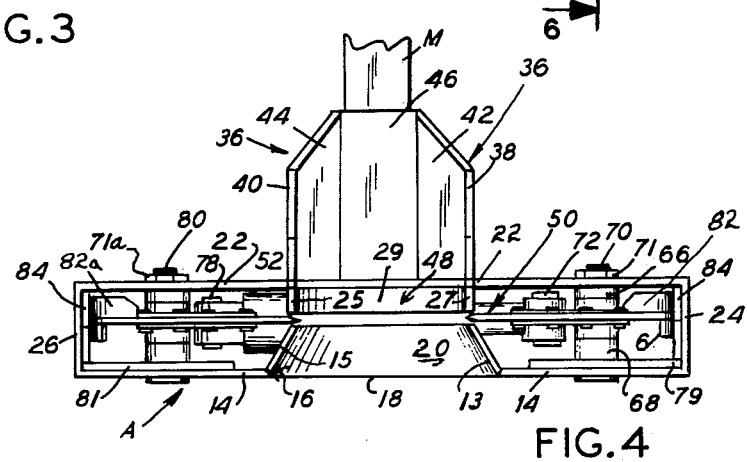
FIG. 4 is a front elevational view of the shear head unit of FIG. 3.
Figure 5:
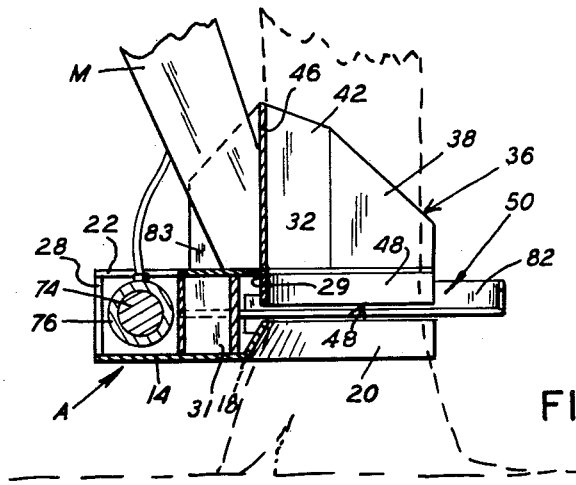
FIG. 5 is a sectional view on the line 5—5 of FIG. 3.

When the blades 50 and 52 are moved from the open position of FIG. 3 to the closed and full shearing position of FIG. 9, the same are caused to move substantially in a single plane by means of the collars 20 and 48, particularly FIG. 4, due to the close proximity of the opposed edges of the collars to the blades as the same pass between the collars. As a result the blades do not follow the grain of the tree but cut off the tree at a right angle as desired. In the shearing movement of the blades it will be seen that the arcuate cutting edge portion of the blades first enters the tree followed by the straight cutting edge portions and the tree T is held against displacement by the tree being forced against and in abutment with the inner semicircular edges of the collars 20 and 28. With the arcuate cutting edge first entering the tree followed by the straight cutting edge the shearing of a tree is accomplished with the minimal of force applied to the blades and with a minimal of damage to the fibres of the tree.

Further with the configuration of the cutting edges 56 and 58 of the blades and pivotal movement thereof there is a continuous and progressive slicing-cutting action by the blades as the same proceed through a tree as opposed to a forced compression type of blade cutting of a tree which can damage the wood fibres of the tree as much as 6-8 inches inwardly from the butt end of the tree. With the slicing-cutting action of applicant's blades there is a minimal of damage to the fibres at the tree but particularly important in trees cut for board lumber as well as trees cut for pulp wood.

I claim:

1. A cross-cut shear for trees comprising:
   a. first and second cooperating blades, each blade having
   b. a straight cutting edge portion terminating in
   c. a convex arcuate cutting edge portion,
   d. a first pivot pin and a second pivot pin spaced from the first pivot pin with the first and second pivot pins mounting each of said convex first and second blades, respectively, with said arcuate edge cutting portions directly opposed for first cutting when said blades are pivoted towards each other with the straight cutting edge portions subsequently cutting and abutting in closed relationship, and
   e. means for pivoting each of said blades.

2. A cross-cut shear for trees comprising:
   a. two cutting blades each
   b. having a convex arcuate cutting edge and
   c. a straight cutting edge issuing therefrom and forming a continuation of the convex arcuate cutting edge,
   d. supporting means,
   e. a first pivot pin carried by said supporting means and a second pivot pin carried by said supporting means and spaced from said first pivot pin,
   f. said first pivot pin mounting one of said cutting blades and said second pivot pin mounting the other of said cutting blades, said convex arcuate cutting edges being directly opposed for first cutting when said blades are pivoted towards each other with the straight cutting edges subsequently cutting and abutting in closed relationship with said arcuate cutting edge portions in nonopposed relationship, and means for pivoting said blade.

3. The device of claim 2 in which said straight cutting edge is tangential to said convex arcuate cutting edge.

4. A cross-cut shear for trees comprising:
   a. support means,
   b. a pair of cutting blades each
   c. having an arcuate cutting edge and
   d. a straight cutting edge issuing tangentially therefrom and forming a continuation of each of said convex arcuate cutting edges,
   f. means pivotally mounting said blades on said support means,
   g. means for pivoting said blades to bring the blades toward one another to cause the arcuate edge to first enter a tree followed by the straight portions which reach abutting alignment,
   h. means for guiding said blades in the pivotal movement, and
   i. means for confining the butt of a sheared tree upon said blades.

5. The device of claim 4 in which said support means includes
   a. an upper plate secured in spaced relation to
   b. a lower plate and between which the blades are located.

6. The device of claim 5 in which said means pivotally mounting said blades includes
   a. a pivot pin removed from the cutting edges and mounted on said upper and lower plates.

7. The device of claim 6 in which said means for pivoting said blades includes
   a. a hydraulic ram connected to each of said blades.

8. The device of claim 7 in which said means for guiding said blades in the pivotal movement includes
   a. a first projection mounted on said lower plate, and
   b. a second projection mounted on said upper plate with said blades moving between said projections and guided thereby against displacement.

9. The device of claim 8 in which said means for confining the butt of a sheared tree upon the blades includes
   a. an upstanding flange on each of said blades.

10. The device of claim 9 in which said support means includes means for limiting the full open position of said blades to thereby balance the blades in equal open position.

* * * * *